March 14, 1972     P. S. VENKATESAN     3,649,375
METHOD OF FORMING METALLIC MATERIAL
Filed Jan. 26, 1970     2 Sheets-Sheet 1
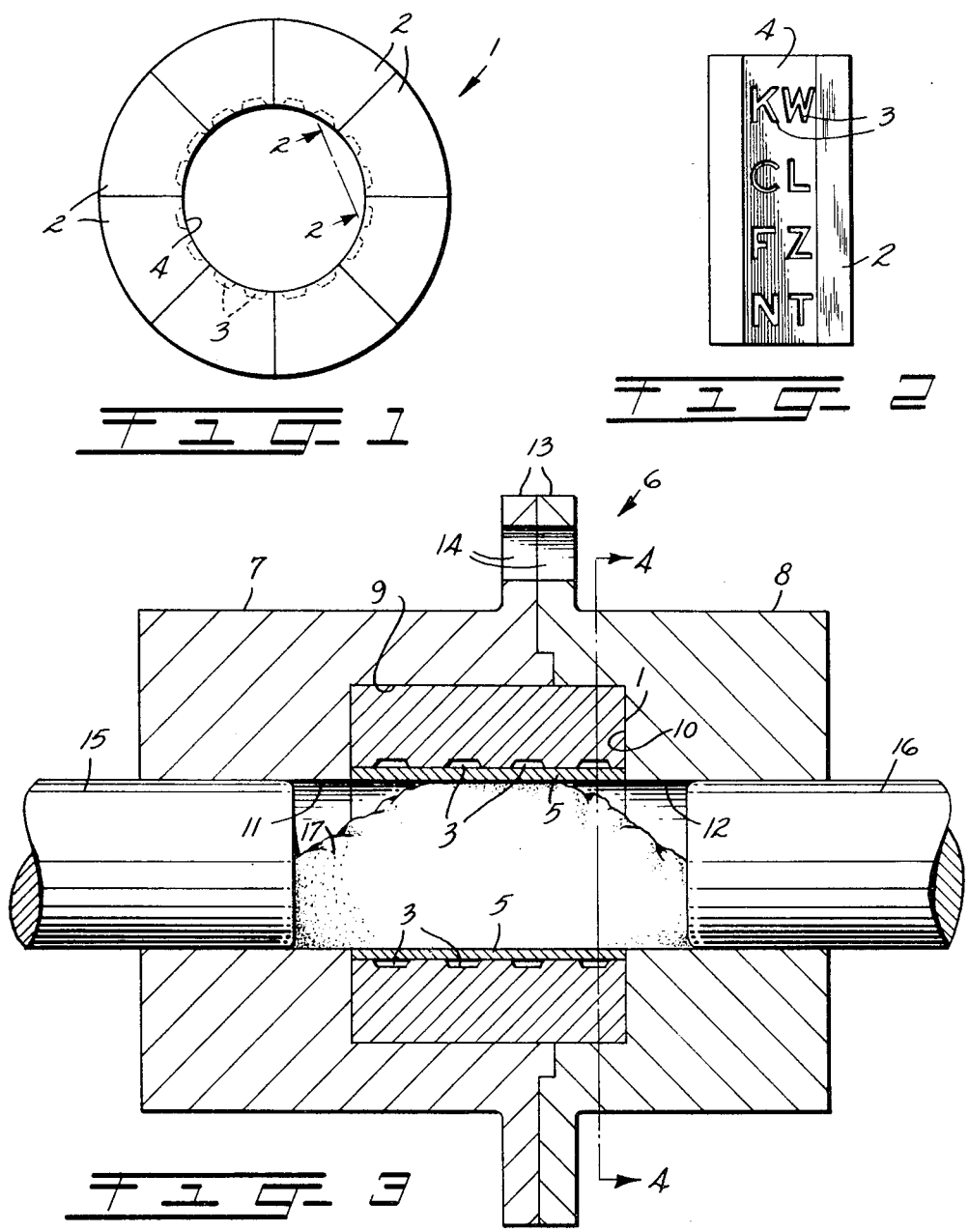
INVENTOR
PERUVEMBA S. VENKATESAN
By Jack Schuman
ATTORNEY March 14, 1972 P. S. VENKATESAN 3,649,375
METHOD OF FORMING METALLIC MATERIAL
Filed Jan. 26, 1970 2 Sheets-Sheet 2

INVENTOR
PERUVEMBA S. VENKATESAN
By Jack Schuman
ATTORNEY

United States Patent Office 3,649,375
Patented Mar. 14, 1972

3,649,375
METHOD OF FORMING METALLIC MATERIAL
Peruvemba Swaminatha Venkatesan, Princeton, N.J., assignor to Western Electric Company, Incorporated, New York, N.Y.
Filed Jan. 26, 1970, Ser. No. 5,712
Int. Cl. C22f 1/16
U.S. Cl. 148—11.5 R                  20 Claims

ABSTRACT OF THE DISCLOSURE

Superplastifiable metallic cylinder (78% by weight zinc, 22% by weight aluminum), in segmented die with intaglio characters, is heated to superplastic state by heated and pressurized thermoplastic material (acrylonitrile-butadiene-styrene) and expanded into die to form printing drum. Thermoplastic material hardened in situ to add mass to cylinder. Aperture may be formed in thermoplastic material simultaneously with expansion of cylinder into die by means of suitable mandrels. Other material, such as thermosetting polymerics or low melting metallics, may be used to heat cylinder to superplastic state and to expand same into die.

BACKGROUND OF THE INVENTION (1) Field of the invention

Broadly speaking, this invention relates to a method of forming metallic material, and the article produced by the said method. More specifically, this invention relates to a method of forming a printing wheel or drum having raised characters thereon, and to the said printing wheel or drum produced by the said method.

(2) Description of the prior art

Printing wheels or drums, having raised characters thereon, are widely employed in teletypewriter systems. These wheels or drums are conventionally manufactured according to the following sequence of steps:

(a) A flat strip of plastic non-metallic material is placed between male and female die members having the desired characters formed therein (i.e., the alpha-numeric configurations) and such characters are, by the application of pressure to the die members, formed or raised on the surface of the flat strip of plastic non-metallic material.

(b) A flat metallic strip is laid on the formed flat non-metallic strip through the process of electro-forming, and the non-metallic strip is then removed from the electro-formed metallic strip.

(c) The electroformed metallic strip, with raised characters thereon, is rolled to form a cylinder of the desired diameter.

(d) The adjacent edges of the rolled electroformed strip are carefully and precisely aligned in a fixture to insure the necessarily precise alignment of characters.

(e) The fixture with the rolled electroformed strip aligned as hereinbefore mentioned is positioned on a block and the adjacent edges are soldered to form a seam.

(f) The seamed cylinder is removed from the fixture and a thermoplastic material is injected into the cylinder and allowed to harden so as to provide mass to the cylinder.

The multistep operation hereinabove described, while generally satisfactory, is expensive and time consuming. Moreover, as the characters are initially formed on a flat strip of material which is subsequently rolled into a cylinder (also referred to at several places herein as a drum or wheel), some distortion may be introduced into these characters when the rolling operation is performed.

The problems inherent in the conventional method of forming the said printing cylinders are solved by the method of the present invention, and a greatly improved printing cylinder is obtained thereby.

SUMMARY OF THE INVENTION

One of the objects of this invention is to provide an improved method of forming metallic material.

Another of the objects of this invention is to provide an improved method of forming a printing cylinder.

Yet another object of this invention is to provide an improved printing cylinder.

Still other and further objects of this invention will become apparent during the course of the following description and by reference to the accompanying drawings and the appended claims.

Briefly, I have discovered that the foregoing objects may be attained, for the preferred embodiment, by assembling a segmented die having the desired characters formed therein in intaglio (i.e., sunken relief) around a cylinder of superplastifiable metallic material, then injected under pressure plastic material into the cylinder, the said plastic material being heated to a temperature sufficient to elevate the temperature of the superplastifiable metallic material to a point at which the said metallic material attains superplasticity, thereby expanding the cylinder of superplastic metallic material against the surrounding wall of the segmented die and into the intaglio characters formed in the die whereby to form the characters in sharp raised relief on the wall of the expanded cylinder, and then allowing the plastic material within the metallic cylinder to harden and add mass thereto.

BRIEF DESCRIPTION OF THE DRAWINGS

Referring now to the drawings, in which like numerals represent like parts in the several views:

FIG. 1 represents a side view of an assembled segmented die;

FIG. 2 represents a frontal elevation of the inner wall of one of the segments of the die as viewed along the line 2—2 of FIG. 1, showing certain intaglio characters formed therein;

FIG. 3 represents a medial longitudinal section of the segmented die assembled around a cylinder of superplastifiable metallic material and surrounded by a housing, with opposed hydraulic rams engaging both ends of a mass of plastic material in the said cylinder;

DESCRIPTION OF THE PREFERRED EMBODIMENT

Figure 4:
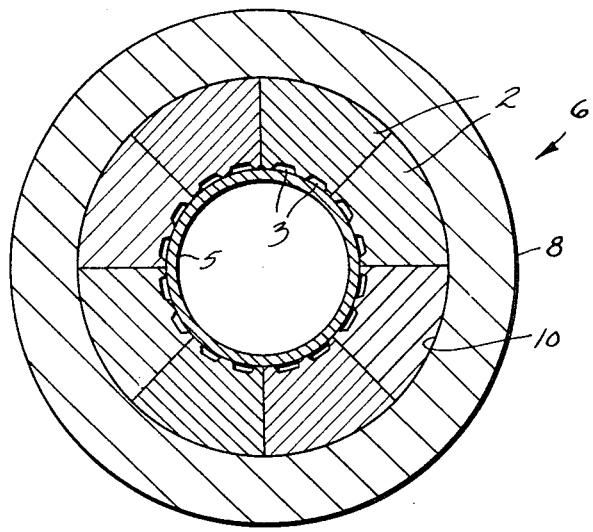
FIG. 4 represents a transverse section taken along the line 4—4 of FIG. 3 showing the housing, segmented die and cylinder.
Figure 6:
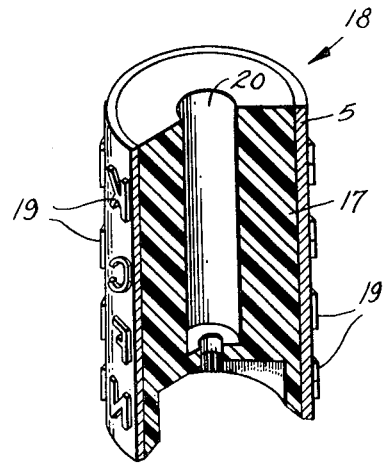
FIG. 6 represents a broken view in perspective of a printing cylinder produced according to the method of the present invention.

The present invention is based upon the unique properties of a fairly newly discovered class of metallic materials known as "superplastics," which have neck-free elongations phenomenally exceeding the elongations of ordinary metallic materials.

For a proper understanding of the present invention, it will be desirable at this point to explain and define "superplastic" and its companion term "superplastifiable" as these terms are employed in this specification and in the appended claims.

Ordinary metallic materials cannot normally be stretched by more than 100% no matter what the temperature is or how slowly tension is applied. Thus, a typical elongation for an alloy steel is approximately 10–15%, and most aluminum alloys are considered quite plastic if their elongations reach 50%. A superplastic alloy, on the other hand, may be elongated as much as 2000% without rupture.

The relationship between the steady-state value of stress during plastic deformation (i.e., the level of stress at which the stress-strain curve has bent over and runs essentially parallel to the strain axis), $\sigma$, and the strain rate, $\dot{\epsilon}$, associated with that value of stress can be expressed by the equation:

$$\sigma = \kappa \dot{\epsilon}^m \quad \text{(Equation 1)}$$

where $\kappa$ is a constant and $m$ is the index of strain rate sensitivity. When $m$ is large, the family of stress-strain curves associated with any material (each of said stress-strain curves being identified with some particular rate of strain) is widely spaced, i.e., the behavior of the material is very much dependent upon the rate at which tension is applied. When $m$ is small, the family of stress-strain curves is closely spaced, i.e., the behavior of the material is essentially independent of strain rate.

In normal (i.e., non-superplastic) metallic materials, $m$ is generally small, usually less than 0.2. In superplastic metallic materials, $m$ is large, ranging from about 0.2 to about 0.8. In physical terms, this means that the behavior of a superplastic tensile specimen depends a great deal on how rapidly tension is applied. This is one criterion of superplasticity.

A high sensitivity to strain rate (i.e., a large value of $m$) is responsible for the enormous elongations characteristic of superplastic metallic materials. Thus, differentiating Equation 1 yields:

$$\frac{d\dot{\epsilon}}{\dot{\epsilon}} = \frac{1}{m}\left[\frac{d\sigma}{\sigma} - \log\left(\frac{\sigma}{\kappa}\right)\frac{dm}{m}\right] \quad \text{(Equation 2)}$$

Neglecting the second term on the right, it will be seen that the larger the value of $m$, the less effect any change in stress will have on a change in strain rate, thus implying quite unusual behavior of superplastic metallic materials. When a specimen of a normal metallic material is subjected to tension, it begins to stretch uniformly, but eventually some local instability causes the specimen to "neck down." This is normally the beginning of the end as the stress at the "neck," by virtue of the reduced cross section, is larger than the stress in the rest of the specimen. As a result, most of the elongation is concentrated at the neck and that is where the specimen eventually ruptures. In a superplastic metallic material, the large value of $m$ greatly reduces the tendency for this to happen as a change in stress such as occurs at the neck, does not cause a very large change in the strain rate, and the area around the neck deforms at a rate comparable to deformation in the remainder of the specimen.

To continue this discussion, $m$, in a more specific sense, is not a constant but actually varies with strain rate. In normal metallic materials, $m$ usually decreases slightly with strain rate. In superplastic metallic materials, $m$ increases with strain rate up to a certain level and decreases thereafter. In normal metallic materials, such negative variation in $m$ will cause the last term on the right in Equation 2 to be added to the preceding term, thus making sensitivity to necking down even more pronounced. Positive variation in $m$ in superplastic metallic materials helps to reduce sensitivity to necking down. In fact, in certain situations, the positive variation in $m$ may be large enough so that the term $$\left[\frac{d\sigma}{\sigma} - \log\left(\frac{\sigma}{\kappa}\right)\frac{dm}{m}\right]$$

approaches zero, thereby essentially eliminating the tendency of material to neck.

One of the distinguishing characteristics of superplastic metallic materials is their extremely small grain size, of the order of 0.001 mm., the grain size of normal metallic materials ranging between 0.1 mm. and several millimeters. Thus, the transformation of a superplastifiable metallic material to its superplastic state may be accomplished, in part, by suitable heat treatment to change the ordinary range of grain size to the extremely small grain size characteristic of superplastic metallic materials. A superplastic metallic material can be transformed to a non-superplastic state by appropriate heat treatment to increase the grain size to the normal range.

Another of the distinguishing characteristics of superplastic metallic materials is the presence of a critical temperature below which the metallic material is merely superplastifiable and above which the metallic material is superplastic (provided, of course, that its grain size is extremely small, as hereinabove described).

Summarizing to this point, the terms "superplastic" and "superplastifiable" as they are employed in this specification and in the appended claims, may be defined as follows:

(1) A superplastic metallic material, broadly speaking, is a metallic material characterized by unusually large elongation under tension with small sensitivity to necking down. More specifically, a superplastic metallic material is one having:

(a) an index of strain rate sensitivity, $m$, from Equation 1, lying between about 0.2 and 0.8, and
(b) an extremely small grain size of the order of 0.001 mm., and
(c) a temperature at or above the critical temperature.

(2) A superplastifiable metallic material, broadly speaking, is a metallic material which is potentially superplastic but is not then in its superplastic state, i.e., the metallic material can be placed in the superplastic state by effecting an appropriate change in condition. More specifically, a superplastifiable metallic material has the extremely small grain size characteristic of superplastic metallic materials, but is at a temperature below the critical temperature, and can be brought to the superplastic condition by elevating its temperature to or above the critical temperature.

The method of the present invention is directed, broadly speaking, to the formation of numerous, fairly closed spaced, precisely formed, diversely shaped, sharp characters in high relief in a printing cylinder. Superplastic metallic materials, having extremely small sensitivity to necking down and thus unusually large elongations under tension, with high stress regions (as would occur particularly at corners of characters) not being subjected to high strains and consequent "thinning out" as in the case of ordinary metallic materials, and being deformable with relatively little effort, are uniquely useful for the method of the present invention.

Turning now to the specific features of the present invention, a cylindrical die 1 is seen as comprising a plurality of individual die segments 2, each with several characters 3 formed in the inner wall 4 thereof in intaglio or sunken relief. A particular individual die segment 2 is shown in FIG. 2 with several typical characters 3 formed therein. The plurality of die segments 2 may be assembled to form the cylindrical die 1 as seen in FIG. 1.

The inner diameter of cylindrical die 1 is adapted to comfortably receive with small (but not critical) clearance a cylinder 5 of superplastifiable metallic material. In the preferred embodiment of the present invention, such superplastifiable metallic material has previously been subjected to an appropriate heat treatment to produce the extremely small grain size characteristic of superplastic metallic materials and requires only an elevation of temperature to the critical temperature in order to become superplastic. Further, in the preferred embodiment, the length of cylinder 5 is equal to the length of cylindrical die 1, as shown particularly in FIG. 3. A preferred composition of the metallic material constituting cylinder 5 is approximately 78% by weight of zinc and 22% by weight of aluminum, having a superplastic critical temperature of approximately 500° F. The composition of the preferred constituents of cylinder 5 could range between approximately 70% by weight and 82% by weight of zinc, balance aluminum.

Housing 6 comprises mating members 7 and 8, with recesses 9 and 10 respectively formed therein and adapted to receive cylinder die 1 and cylinder 5. It will be noted, from FIG. 3, that, with members 7 and 8 assembled, the length of combined recesses 9 and 10 is equal to the length of cylindrical die 7 and cylinder 5. Moreover, the diameters of recesses 9 and 10 are equal to the outer diameter of cylindrical die 1.

Members 7 and 8 are respectively provided with central apertures 11 and 12, respectively, the said apertures 11 and 12 preferably having their longitudinal axes aligned with the longitudinal axes of cylinder 5 and cylindrical die 1.

Means are provided to hold members 7 and 8 in assembled relation surrounding cylindrical die 1 and cylinder 5 against any internal pressures tending to force such members 7 and 8 apart. Such means may, for example, comprise mating flanges 13 formed on the said members 7 and 8 and provided with holes 14 through which suitable bolts (not shown) may be passed and threaded nuts (likewise not shown) employed to fasten the flanges 13 together. Other suitable means known to the art may be employed in lieu of the means just described, to hold members 7 and 8 in assembled relation against internal pressures.

Slidably reciprocably mounted in apertures 11 and 12 are rams 15 and 16, respectively, operated by conventional means (not shown) such as hydraulic cylinders and the like. Rams 15 and 16 are adapted to be forced inwardly from both ends of housing 6 toward the center thereof to apply pressure to both ends of a mass 17 of plastic material, for the purpose hereinafter described or, selectively, the said rams 15 and 16 may be retracted from the center of housing 6.

Members 7 and 8 of housing 6 are so proportioned as to adequately resist internal pressures when assembled, and are preferably of metal, whereby the said members 7 and 8 may be heated and/or cooled, for the purposes hereinafter described.

In the practice of the method of the present invention, segments 2 are assembled about cylinder 5, and the assembled cylindrical die 1 and cylinder 5 are inserted into one of the recesses 9 or 10 of members 7 or 8, respectively. The other member 8 or 7 is mated with the first said member 7 or 8, whereby housing 6 is assembled around cylindrical die 1, and the members 7 and 8 are suitably secured together, as by bolt and nuts or in other conventional manner. As mentioned before, the material constituting cylinder 5 has the extremely small grain size characteristic of superplastic metallic materials and requires only elevation of temperature to the critical temperature in order to become superplastic.

Housing 6 may then be heated to or above the critical temperature for the particular superplastifiable material constituting cylinder 5, and an appropriate quantity of plastic material 17, likewise heated to the said critical temperature, is inserted through aperture 11 or 12. Rams 15 and 16 are mounted in apertures 11 and 12, respectively, and forced inwardly toward the center of housing 6 under suitable force, thereby to apply suitable pressure to the plastic material 17, the said heated plastic material 17 heating cylinder 5 from the inside thereof to the critical temperature and expanding the said cylinder 5 against the inner wall 4 of cylindrical die 1 and forcing appropriate portions of the said cylinder 5 into the intaglio characters 3. The heated housing 6 is intended to prevent the temperature of the exterior surface of cylinder 5 from falling below the critical temperature. As mentioned previously, the physical properties of superplastic metallic materials render such metallic materials uniquely suited to the formation of numerous, fairly closely spaced, precisely formed, diversely shaped, sharp characters in high relief on cylinder 5.

The plastic material 17 is allowed to cool to ambient temperature and harden in situ. Rams 15 and 16 are retracted, housing 6 disassembled, and cylindrical die 1 disassembled. The finished article 18, with raised characters 19 formed thereon, specifically a printing cylinder, may be suitably drilled to provide a central aperture 20 permitting the said article 18 subsequently to be mounted on a shaft. The said article 18 may be subjected to one or more electroplating operations, e.g., chromium plating, thereby to provide a finished surface of the desired hardness and smoothness.

Generally, it will not be required to subject cylinder 5, after it has been expanded into cylindrical die 1, to any particular heat treatment, as once its temperature has been reduced below the critical temperature, it loses its superplasticity. Under some circumstances, however, it may be desired to coarsen the grain structure of cylinder 5 to the ordinary range of grain size, as by slow controlled cooling, whereby the material of the said cylinder 5 acquires only ordinary physical properties and is not subject to reacquisition of superplasticity merely by having its temperature re-elevated to the critical temperature.

Figure 5:
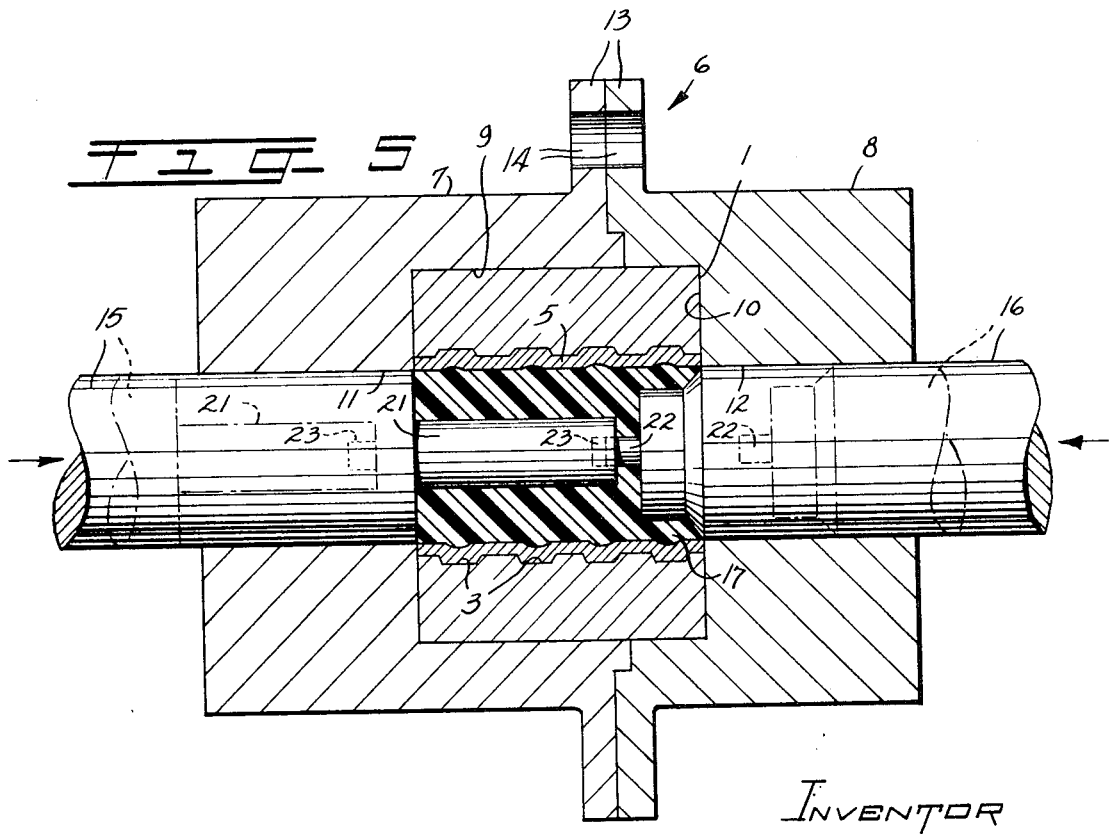
FIG. 5 represents a view similar to FIG. 3 showing a modification of the hydraulic rams whereby an aperature of appropriate profile and diameter is formed in the plastic simultaneous with the expansion of the cylinder into the segmented die, the position of the rams before advancement being shown in phantom.

It will often be advantageous to form the aperture 20 in plastic material 17 simultaneously with expansion of the cylinder 5 into cylindrical die 1. This may be done by providing a mandrel within cylinder 5 along its longitudinal axis. FIG. 5 shows one means of accomplishing this result. Article 18, constituting a typical Teletype printer, may have an aperture 20 with a first diameter at one end, a second diameter at the other end, and a third and lesser diameter intermediate its two ends. Extensions 21 and 22, mounted respectively on rams 15 and 16, have the contours and diameters desired in the aperture 20 of the finished article 18. It will be apparent that, when such rams 15 and 16 are forced toward the center of housing 6. the mass 17 of plastic material will, simultaneously with expanding and heating cylinder 5, itself be provided with an aperture 20 of the desired configuration. It may be desired to provide for some physical clearance between the advancing opposed rams 15 and 16. This may be done by providing extension 21 with an aperture 23 adjusted to slidably receive the end of extension 22.

The opposed rams 15 and 16 may be retracted to remove extensions 21 and 22 from aperture 20 after plastic material 17 has cooled to ambient temperature and hardened in situ, either before or after disassembly of cylindrical die 1.

In a preferred embodiment, plastic material 17 may be selected from the group of materials commonly known as thermoplastic materials or polymers. Moreover, material 17 may be selected from metallic materials having a melting point lying between the superplastic critical temperature of the cylinder 5 and the melting point of cylinder 5.

In practicing the preferred mode, material 17 is thermoplastic, and has a charring temperature lying well above the superplastic critical temperature of the cylinder 5. Specifically, where the material of the cylinder 5 is an aluminum-zinc alloy with 78% by weight of zinc and 22% by weight of aluminum, material 17 is advantageously a commercial grade of thermoplastic material known in the industry as ABS (a copolymer of acrylonitrile, butadiene and styrene). The superplastic critical temperature of the aluminum-zinc alloy is approximately 500° F., and the charring temperature of the ABS plastic material is approximately 600–650° F. When using thermoplastic material 17 to heat and expand a particular metallic material, it is important to be able to raise the temperature of the metallic material to its superplastic critical temperature without charring and thus destroying the plastic material 17.

Superplastic metallic materials having critical temperatures sufficiently low to enable these materials to be used advantageously with ABS or similar polymeric materials are listed in the following table. The index of strain rate sensitivity, $m$, has been given, where available.

| Material (approximate percent by weight) | $m$, Index of stress rate sensitivity | Approximate critical temperature, °F. |
|---|---|---|
| Aluminum-zinc (several compositions) | 0.5–0.8 | 500 |
| Bismuth-tin (several compositions) | 0.5–0.7 | 100 |
| Bismuth-lead (56.5–43.5) | (1) | 100 |
| Lead-cadmium (82.6–17.4) | 0.5–0.6 | 200 |
| Lead-tin (several compositions) | 0.5–0.6 | 100 |

[1] Not available.

Superplastic metallic materials having critical temperatures too high to be used with ABS or similar polymeric materials, but nevertheless useful in the practice of the present invention with other materials 17 such as metallic materials of sufficient low melting point are listed in the following table:

| Material (approximate percent by weight) | $m$, Index of strain rate sensitivity | Approximate critical temperature, °F. |
|---|---|---|
| Aluminum-copper (67–33) | 0.7 | 900 |
| Aluminum-silicon (88.3–11.7) | 0.5 | 1,000 |
| Chromium-cobalt (72.5–27.5) | (1) | 2,200 |
| Copper-magnesium (81–19) | (1) | 1,200 |
| Iron-chromium-nickel-titanium-aluminum-carbon (68.49-25-5.7-0.69-0.1-0.02) | (1) | 1,800 |
| Iron-manganese-carbon (97.68–1.9–0.42) | 0.5–0.6 | 1,400 |
| Magnesium-aluminum (67.7–32.3) | (1) | 700 |
| Magnesium-nickel (76.5–23.5) | (1) | 750 |
| Titanium-aluminum-vanadium (90–6–4) | 0.6–0.7 | 1,250 |
| Titanium-aluminum-tin (92.5–5–2.5) | 0.4–0.5 | 1,800 |

[1] Not available.

It will be apparent that superplastic metallic materials other than those specifically mentioned herein may be useful in the practice of the present invention.

What is claimed is:

1. Method of producing a formed metallic member, said method comprising:
   (a) placing a superplastifiable metallic blank in contact with a die;
   (b) placing a pressure-transmittable material in contact with said superplastifiable metallic blank opposite said die, said pressure-transmittable material being heated from ambient temperature to at least the critical temperature at which said superplastifiable metallic blank becomes superplastic, the said pressure-transmittable material being solid at ambient temperature and moldable at said critical temperature, thereby to raise the temperature of said superplastifiable metallic blank to at least said critical temperature whereby said superplastifiable metallic blank becomes superplastic, and applying pressure to said heated pressure-transmittable material to force said superplastic metallic blank into said die thereby to produce a formed superplastic metallic member;
   (c) cooling said heated pressure-transmittable material and said formed superplastic metallic member from at least said critical temperature to ambient temperature, said pressure-transmittable material hardening in situ against said formed metallic member;
   (d) separating said die from said formed metallic member.

2. Method as in claim 1, wherein:
   (e) said pressure-transmittable material is an organic polymeric material having a charring temperature above the critical temperature at which said superplastifiable metallic blank becomes superplastic.

3. Method as in claim 1, wherein:
   (e) said pressure-transmittable material is a metallic composition having a melting point above ambient temperature and below the critical temperature at which said superplastifiable metallic blank becomes superplastic.

4. Method as in claim 1, wherein:
   (e) said pressure-transmittable material is an acrylonitrile-butadiene-styrene copolymer,
   (f) the critical temperature at which said superplastifiable metallic blank becomes superplastic is no higher than approximately 500° F.

5. Method as in claim 4, wherein:
   (g) said metallic blank is an alloy of aluminum and zinc containing approximately 78% by weight of zinc and approximately 22% by weight of aluminum.

6. Method as in claim 4, wherein:
   (g) said metallic blank is an alloy of aluminum and zinc containing from about 70% by weight to about 82% by weight of zinc, balance aluminum.

7. Method as in claim 1, wherein:
   (e) the temperature of said die is raised to at least the critical temperature at which said superplastifiable metallic blank becomes superplastic prior to applying pressure to said heated pressure-transmittable material,
   (f) said heated die is cooled from at least said critical temperature to ambient temperature after pressure has been applied to said heated pressure-transmittable material to force said superplastic metallic blank into said die.

8. Method as in claim 1, wherein:
   (e) said die bears characters,
   (f) said superplastic metallic blank receives the impression of said characters when forced into said die by said pressurized heated pressure-transmittable material.

9. Method as in claim 1, wherein:
   (e) said die has characters formed therein in sunken relief,
   (f) said characters are formed in raised relief on said superplastic metallic blank when said superplastic metallic blank is forced into said die by said pressurized heated pressure-transmittable material.

10. Method as in claim 1, wherein:
    (e) said superplastifiable metallic blank is in the form of a cylinder,
    (f) said die is in the form of a cylinder adapted to surround the cylindrical periphery of said blank.

11. Method as in claim 9, wherein:
    (g) said die is in the form of segments adapted to be assembled in the form of a cylinder surrounding the cylindrical periphery of said blank.

12. Method of producing a cylindrical printing member having raised characters on the cylindrical periphery thereof, said method comprising:
    (a) placing a superplastifiable hollow metallic cylinder into contact with the wall bounding the central opening of a cylindrical die, said wall having characters formed therein in sunken relief;
    (b) inserting a pressure-transmittable material into the hollow of said superplastifiable metallic cylinder in contact therewith, said pressure-transmittable material being heated from ambient temperature to at least the critical temperature at which said superplastifiable metallic cylinder becomes superplastic, the said pressure-transmittable material being solid at ambient temperature and moldable at said critical temperature, thereby to raise the temperature of said superplastifiable metallic cylinder to at least said critical temperature whereby said superplastifiable metallic cylinder becomes superplastic, and applying pressure to said heated pressure-transmittable material to force said superplastic metallic material outwardly into the said cylindrical die whereby said characters are formed in raised relief on the cylindrical periphery of said superplastic metallic cylinder;

(c) cooling said heated pressure-transmittable material and said superplastic metallic cylinder after completion of the preceding step from at least said critical temperature to ambient temperature, said pressure-transmittable material hardening in situ within the hollow of said metallic cylinder and in contact therewith, the said hardened pressure-transmittable material and the said cooled metallic cylinder constituting a cylindrical printing member;

(d) separating said die from said cylindrical printing member.

13. Method as in claim 12, wherein:
(e) said pressure-transmittable material is an organic polymeric material having a charring temperature above the critical temperature at which said superplastifiable metallic cylinder becomes superplastic.

14. Method as in claim 12, wherein:
(e) said pressure-transmittable material is a metallic composition having a melting point above ambient temperature and below the critical temperature at which said superplastifiable metallic cylinder becomes super-plastic.

15. Method as in claim 12, wherein:
(e) said pressure-transmittable material is an acrylonitrile-butadiene-styrene copolymer,
(f) the critical temperature at which said superplastifiable metallic cylinder becomes superplastic is no higher than approximately 500° F.

16. Method as in claim 15, wherein:
(g) said metallic cylinder is an alloy of aluminum and zinc containing approximately 78% by weight of zinc and 22% by weight of aluminum.

17. Method as in claim 15, wherein:
(g) said metallic cylinder is an alloy of aluminum and zinc containing from about 70% by weight to about 82% by weight of zinc, balance aluminum.

18. Method as in claim 12, wherein:
(e) the temperature of said cylindrical die is raised to at least the critical temperature at which said superplastifiable metallic cylinder becomes superplastic prior to applying pressure to said heated pressure-transmittable material,
(f) said heated die is cooled from at least said critical temperature to ambient temperature after pressure has been applied to said heated pressure-transmittable material to force said superplastic metallic cylinder into said cylindrical die.

19. Method as in claim 12, further comprising:
(e) mounting a mandrel within the hollow of said metallic cylinder along the longitudinal axis thereof while applying pressure to said heated pressure-transmittable material, thereby to form a longitudinal aperture in said heated pressure-transmittable material;
(f) removing said mandrel from said aperture after said pressure-transmittable material has cooled from at least said critical temperature to ambient temperature and hardened in situ.

20. Method as in claim 12, said cylindrical die comprising a plurality of assemblable die segments, wherein:
(e) the aforementioned step (a) comprises assembling said die segments around the cylindrical periphery of said superplastifiable metallic cylinder thereby to form said cylindrical die,
(f) the aforementioned step (d) comprises disassembling said cylindrical die from around the cylindrical periphery of said cylindrical printing member.

References Cited
UNITED STATES PATENTS

| | | | |
|---|---|---|---|
| 3,535,766 | 10/1970 | Hymes | 29—421 |
| 3,420,717 | 1/1969 | Fields, Jr., et al. | 148—11.5 R |
| 3,340,101 | 9/1967 | Fields | 148—11.5 R |

L. DEWAYNE RUTLEDGE, Primary Examiner

W. W. STALLARD, Assistant Examiner

L-566-PT
(6-69)

UNITED STATES PATENT OFFICE
CERTIFICATE OF CORRECTION

Patent No. 3,649,375　　　　　Dated March 14, 1972

Inventor(s) Peruvemba Swaminatha Venkatesan

It is certified that error appears in the above-identified patent and that said Letters Patent are hereby corrected as shown below:

IN THE SPECIFICATION:

Column 4, line 10, "and" should read --to--.

Column 6, line 45, "6." should read --6,--.

Column 7, line 14, in the table, second column, "m, Index of stress rate sensitivity" should read --m, Index of strain rate sensitivity--.

Signed and sealed this 16th day of July 1974.

(SEAL)
Attest:

McCOY M. GIBSON, JR.　　　　　C. MARSHALL DANN
Attesting Officer　　　　　　　Commissioner of Patents